(12) United States Patent
Wang et al.

(10) Patent No.: US 8,033,818 B2
(45) Date of Patent: Oct. 11, 2011

(54) INJECTION MOLD

(75) Inventors: Xian Yun Wang, Taipei (TW); Xiaoping Wu, Taipei (TW); Shih-Hsiung Ho, Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 51 days.

(21) Appl. No.: 12/699,062

(22) Filed: Feb. 3, 2010

(65) Prior Publication Data

US 2011/0189334 A1    Aug. 4, 2011

(51) Int. Cl.
*B29C 45/40* (2006.01)
(52) U.S. Cl. .................. 425/556; 425/572; 425/577
(58) Field of Classification Search .................. 425/556, 425/572, 575, 577
See application file for complete search history.

(56) References Cited

U.S. PATENT DOCUMENTS

| | | | |
|---|---|---|---|
| 4,820,149 A * | 4/1989 | Hatakeyama et al. | 425/572 |
| 4,889,480 A * | 12/1989 | Nakamura et al. | 425/577 |
| 6,235,231 B1 * | 5/2001 | Martin | 425/577 |
| 7,381,049 B2 * | 6/2008 | Li et al. | 425/556 |

* cited by examiner

*Primary Examiner* — Timothy Heitbrink

(57) ABSTRACT

An injection mold for insert molding includes a stationary plate, a first core and a second core. The stationary plate defines an upper surface and a side surface perpendicular to the upper surface. The upper surface has a slot at a middle portion thereof. The slot extends perpendicular to the side surface and reaches the side surface. The first core is received in the slot of the stationary plate and defines a holding element on a top surface thereof for securing an insert. The second core is closed with the first core to form a mold cavity, with the insert extending into the mold cavity. The first core is capable of being taken off from the slot of the stationary plate when the first core and the second core are detached from each other.

3 Claims, 5 Drawing Sheets

INJECTION MOLD

BACKGROUND OF THE INVENTION

1. Field of the Invention

The present invention relates to an injection mold, and in particular to an injection mold for insert molding.

2. The Related Art

Insert molding is a highly efficient process by which metal stampings, bushings, electromechanical parts, filtration materials, and other discrete parts are combined into a single component through the injection of thermoplastic around the carefully placed parts (inserts). A conventional injection mold for insert molding includes a cavity plate and a core plate. The cavity plate has a cavity insert fixed thereon, and the core plate has a core insert fixed thereon. The cavity insert and the core insert form a mold cavity therebetween when the cavity plate closes to the core plate. A set of inserts are fixed on the core insert beforehand and extended into the mold cavity for incorporating with thermoplastic to form a molding product.

However, because the core insert is fixed on and can be not taken off from the core plate, when it comes to carry out the next molding process, people have to take off the molding product from the core insert, and be aware of other sets of the inserts on the core insert. It takes a long time. Therefore, the molding cycle is prolonged and the injection molding process is inefficient.

SUMMARY OF THE INVENTION

It is an object of the present invention to provide an injection mold which can shorten the molding cycle and increase the efficiency of the injection molding.

In order to achieve the foregoing object, the injection mold for insert molding comprises a stationary plate, a first core and a second core. The stationary plate defines an upper surface and a side surface perpendicular to the upper surface. The upper surface has a slot at a middle portion thereof. The slot extends perpendicular to the side surface and reaching the side surface. The first core is received in the slot of the stationary plate and defines a holding element on a top surface thereof for securing an insert and a securing cavity in the top surface. The second core engages with the first core to form a mold cavity therebetween, with the insert extending into the mold cavity. The second core has a securing portion protruding downwards from a portion of a bottom surface thereof. The securing portion is placed in the securing cavity to secure the first core in the slot of the stationary plate. The first core is capable of being slid out from the slot of the stationary plate when the first core and the second core are detached from each other.

As the above description, the first core is capable of being taken off from the slot of the stationary plate when the first core and the second core are detached from each other. It means that more than one first core can be interchangeably used for injection molding. When one first core with a molding product is taken out of the stationary plate, the other first core with the insert will slide immediately into the slot of the stationary plate for carrying out the next injection molding process. Therefore, the injection molding cycle is shortened and the efficiency of the injection molding is increased greatly.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
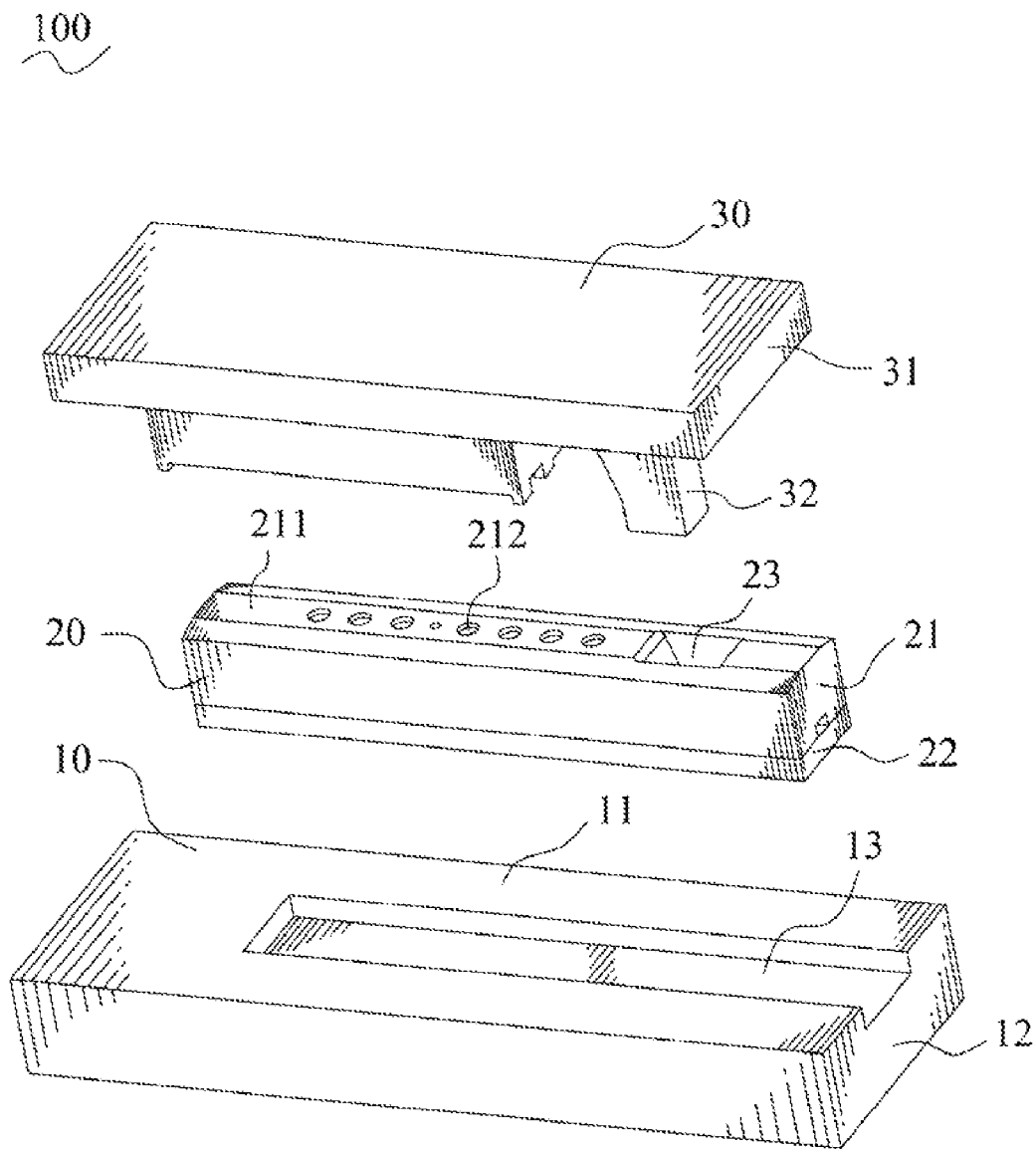
FIG. 1 is a perspective view of an injection mold of an embodiment according to the present invention.

Referring to FIG. 1, an injection mold 100 for insert molding includes a stationary plate 10, a first core 20, and a second core 30 coupled with the first core 20. The stationary plate 10, which is a substantially rectangular plate, defines an upper surface 11 and a side surface 12 perpendicular to the upper surface 11. The upper surface 11 has a slot 13 at a middle portion thereof. The slot 13 extends perpendicularly to the side surface 12 and reaches the side surface 12.

Figure 2:
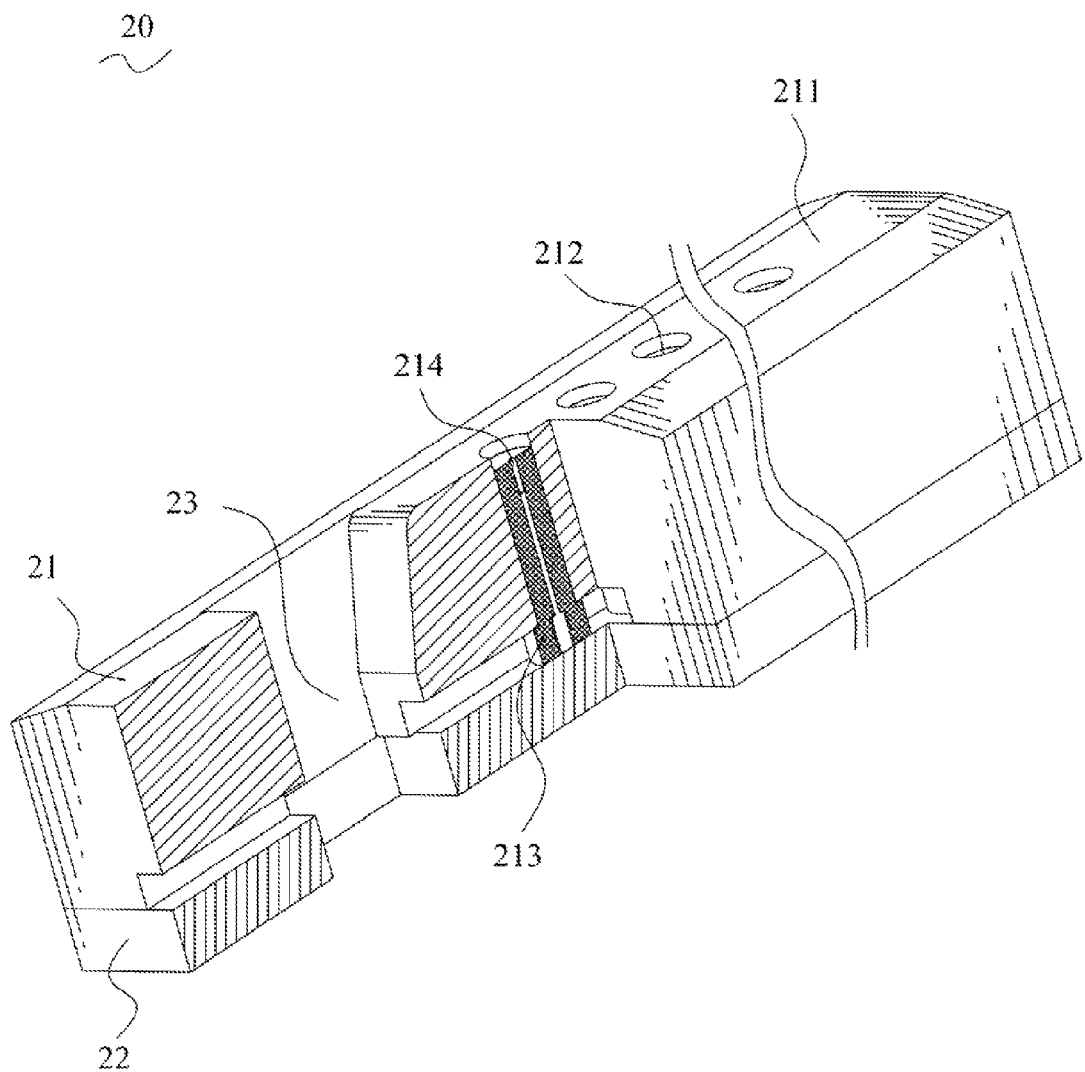
FIG. 2 is a partially cutaway view of a first core of the injection mold shown in FIG. 1.
Figure 3:
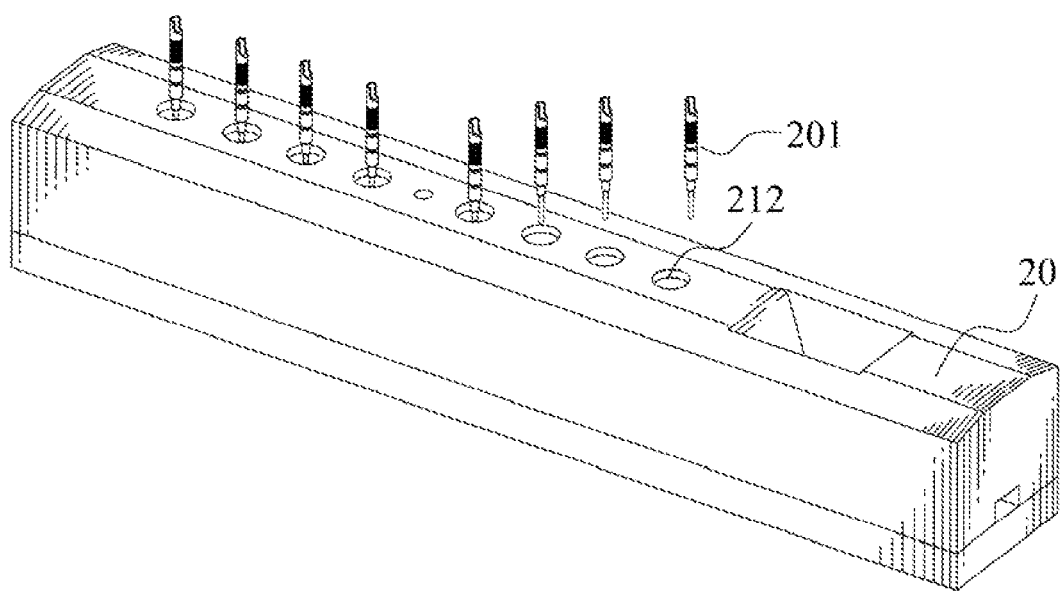
FIG. 3 is a schematic view showing a plurality of inserts inserted into corresponding fixing holes of the first core of the injection mold of FIG. 1.
Figure 4:
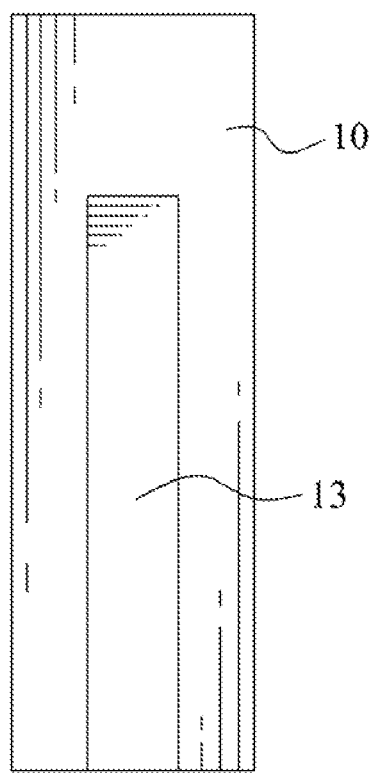
FIG. 4 is a schematic view to show a state that the first core is pulled out of a slot of a stationary plate of the injection mold of FIG. 1.
Figure 4:
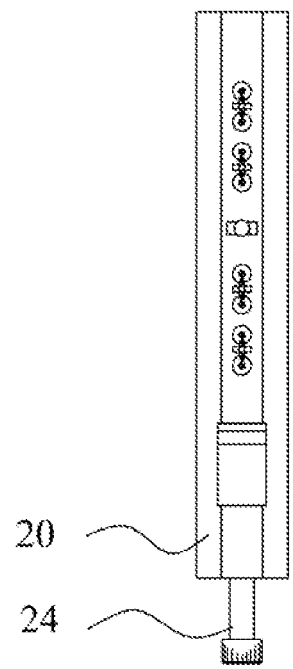

With reference to FIGS. 1 and 2, the first core 20 is substantially an elongated block and includes an upper portion 21 and a bottom portion 22. A plurality of receiving holes 212 extend downwards from a top surface 211 of the upper portion 21 and are arranged in a line. Each of the receiving holes 212 is adapted for receiving a fixing rod 213 from a bottom thereof. The fixing rod 213 has a fixing hole 214 extending along an extending direction thereof to penetrate two opposite ends thereof. The bottom portion 22 is fixed to a bottom of the upper portion 21 to secure the fixing rod 213 in the receiving hole 212. The first core 20 further has a securing cavity 23 adjacent to an end thereof. The securing cavity 23 extends through the upper portion 21 and the bottom portion 22.

Referring to FIG. 1 again, the second core 30 includes a flat plate 31 with a securing portion 32 protruding downwards from a side of a bottom surface thereof. The securing portion 32 is shaped so as to be placed in the securing cavity 23 to secure the first core 20 in the slot 13 of the stationary plate 10.

Figure 5:
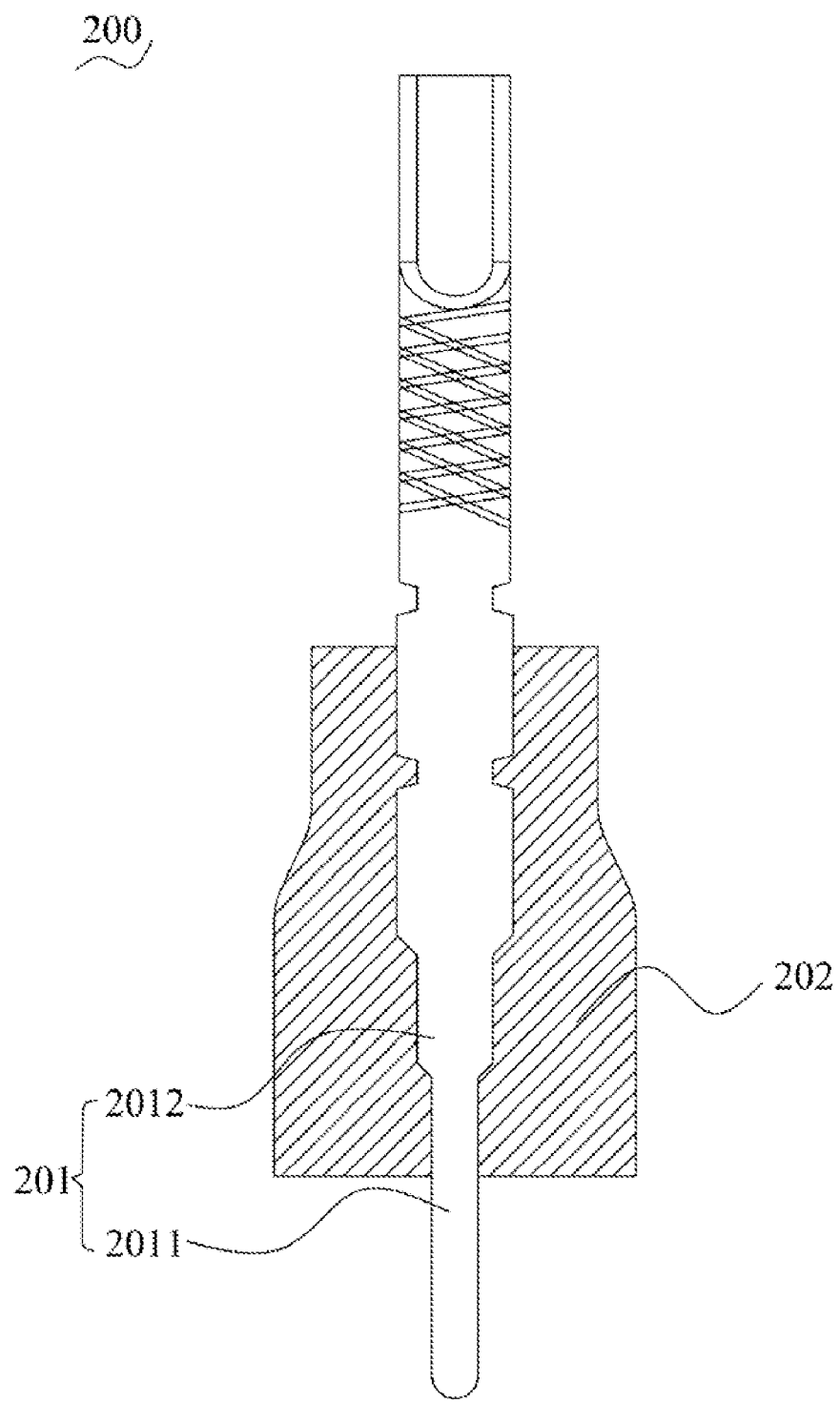
FIG. 5 is a cross-sectional view of an injection molding product molded by the injection mold shown in FIG. 1.

Refer to FIGS. 1-4 in conjunction with FIG. 5, to mold a molding product 200, an insert 201 has to be inserted in the corresponding fixing hole 214, with an insert portion 2011 fixed in the corresponding fixing hole 214 and a molding portion 2012 exposed outside. The first core 20 is slid into the slot 13 from an open end thereof and the second core 30 is closed to the first core 20. The securing portion 32 is fixed into the securing cavity 23. The molding portion 2012 extends into a mold cavity (not shown) formed by the first core 20 and the second core 30. Then, injection molding process can be carried out. Thermoplastic is injected into the mold cavity and is solidified onto the molding portion 2012 to form a plastic sleeve 202.

After the injection molding process, the second core 30 is detached from the first core 20, and the first core 20 remains on the stationary plate 10. The molding product 200 is located on the first core 20 with the plastic sleeve 202 wrapped the molding portion 2012 of the insert 201. Then, the first core 20 will be taken out of the stationary plate 10. For convenience, the first core 20 further has a pull-bar 24 for pulling the first core 20 out of the stationary plate 10. The pull-bar 24 is located on a lateral of the first core 20, and protrudes beyond the side surface 12 of the stationary plate 10 when the first core 20 is secured on the stationary plate 10. For shortening the injection molding cycle, several first cores with the insert are prepared in advance. When one first core with the molding product is taken out of the stationary plate 10, the other first core with the insert will be slid immediately into the slot 13 of the stationary plate 10 for carrying out the next injection molding process.

As described above, the first core 20 is capable of being taken off from the slot 13 of the stationary plate 10 when the first core 20 and the second core 30 are detached from each other. It means that more than one first core 20 can be interchangeably used for injection molding. When one first core with the molding product is taken out of the stationary plate 10, the other first core with the insert will be slid immediately into the slot 13 of the stationary plate 10 for carrying out the next injection molding process. Therefore, the injection molding cycle can be shortened and the efficiency of the injection molding can be increased greatly.

An embodiment of the present invention has been discusses in detail. However, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. An injection mold for insert molding, comprising:
    a stationary plate defining an upper surface and a side surface perpendicular to the upper surface, the upper surface having a slot at a middle portion thereof, the slot extending perpendicular to the side surface and reaching the side surface;
    a first core received in the slot of the stationary plate and defining a holding element on a top surface thereof for securing an insert and a securing cavity in the top surface; and
    a second core for engaging with the first core to form a mold cavity therebetween, with the insert extending into the mold cavity, the second core having a securing portion protruding downwards from a portion of a bottom surface thereof, the securing portion being placed in the securing cavity to secure the first core in the slot of the stationary plate, wherein the first core is capable of being slid out from the slot of the stationary plate when the first core and the second core are detached from each other.

2. The injection mold as claimed in claim 1, wherein the holding element includes at least a receiving hole extending downwards from the top surface of the first core, and a fixing rod is received in the receiving hole and defines a fixing hole extending through two ends thereof.

3. The injection mold as claimed in claim 1, wherein the stationary plate includes a side surface connected with the upper surface, a pull-bar is defined on a lateral of the first core and protrudes beyond the side surface of the stationary plate.

* * * * *